Jan. 3, 1933.　　　　F. O. KILGORE　　　　1,893,058
HYDRAULIC SHOCK ABSORBER
Filed Nov 7, 1929
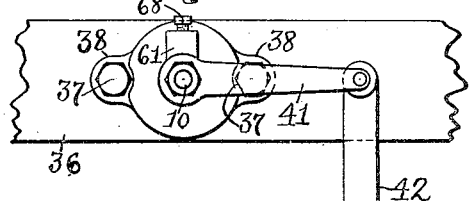
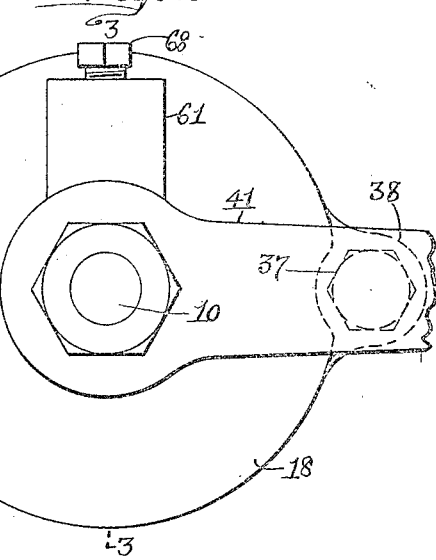
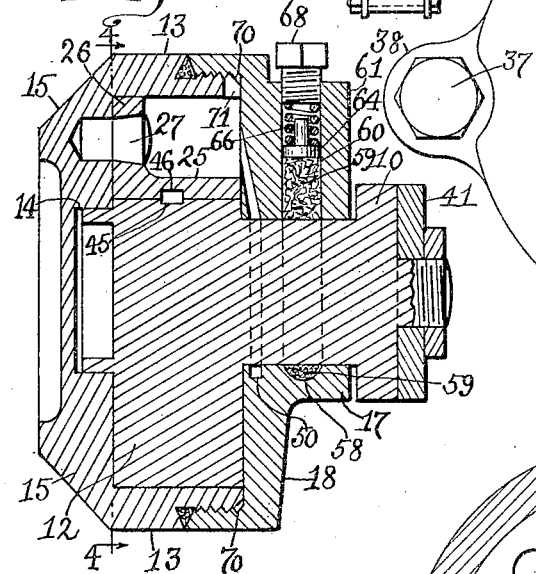
Inventor.
Frederick O. Kilgore
By Jas. H. Churchill
Atty.

Patented Jan. 3, 1933

1,893,058

UNITED STATES PATENT OFFICE

FREDERICK O. KILGORE, OF BOSTON, MASSACHUSETTS

HYDRAULIC SHOCK ABSORBER

Application filed November 7, 1929. Serial No. 405,373.

This invention relates to a cushioning device or shock absorber for motor vehicles, and of that type in which oil or other fluids are employed to resist movement of a piston operatively connected with a spring which supports the body of the motor vehicle.

One object of the invention is to provide a novel shock absorber of this type in which provision is made for adjusting a resistance offered by the fluid to the movement of the piston in opposite directions in a novel and superior manner.

A further object of the present invention is to provide a novel and improved construction of shock absorber of the character specified in which provision is made for maintaining a lubricating packing between the operating shaft and its bearing in a novel and superior manner, preventing the usual leakage around the operating shaft which has been experienced in prior types of shock absorbers of this general character.

A still further object of the invention is to provide a novel and simplified construction of shock absorber of this type which may be manufactured more economically than prior constructions of which I am aware, and which is substantial in construction and durable in operation.

These and other features of this invention will be pointed out in the claims at the end of this specification.

In the drawing illustrating one embodiment of the invention—

Fig. 1 represents a portion of a motor vehicle provided with a shock absorber embodying the invention;

Fig. 2, a front elevation on an enlarged scale of the shock absorber shown in Fig. 1;

Fig. 3, a vertical section taken on the line 3—3, Fig. 2;

Fig. 4, a sectional detail on the line 4—4, Fig. 3, illustrating the improved device for adjusting the by-pass of the fluid from one chamber to another, and Fig. 5, a detail in similar section illustrating the valve in a different position of adjustment.

The embodiment of the invention herein shown is especially designed for the use of oil or other fluid as the resisting medium, and is provided with a rock-shaft 10 having a piston or wing 12 extended radially therefrom near the inner end thereof and located in a casing 13 in which the piston 12 oscillates.

The rock-shaft 10 has its inner end journaled in a circular recess 14 in the rear wall 15 of the casing 13, and has its outer end journaled in a hub 17 of a removable front wall or cap member 18 for the casing 13.

In the present case, the casing 13 is subdivided into two compartments 22, 23 by a wall or partition 24 having a curved intermediate portion 25 of substantially the same radius as the rock-shaft 10 (see Fig. 4).

The partition or wall 24 is provided with a curved flange 26 which is secured by rivets 27 or otherwise to the rear wall 15 of the casing.

The partition or wall 24 constitutes an abutment for oil or other fluid in the compartment 23 to be forced against by the piston 12 which subdivides the compartment 23 into two chambers 28, 29, which may be automatically supplied with oil from the compartment 22 through a port 30 in the abutment wall 24.

The port 30 is controlled by a valve 32 adapted to be opened by gravity and rest upon a supporting device or pin 34 and to be closed by the pressure of the oil created by the reciprocating piston 12.

The casing 13 is attached to the body or chassis 36 of the motor vehicle by means of bolts 37 extended through the lugs or ears 38 on the casing.

In the present instance, the rock-shaft 10 is represented as connected with the front axle 40 of the motor vehicle, which is effected by a crank or arm 41 attached to the front end of the rock-shaft which projects beyond the hub 17 of the cap member 18 for the casing 13, and by a link 42 and stirrup 43.

In the operation of the motor vehicle over the highways obstructions are encountered and the body-supporting springs (not shown) have two distinct movements, to wit: a compression or downward movement, and a rebound or upward movement, and these movements vary according to the condition of the springs and of the roadway.

Provision is made for causing the oil or other fluid to by-pass from one of the operating chambers 28, 29 to the other accordingly as the piston is forced in either direction under different road conditions and to offer resistance to the movement of the piston.

As herein shown such by-passing of the oil is effected through co-operating grooves 45, 46 formed in the upper portion of the piston 12 secured to the rock-shaft 10, and in the curved portion 25 of the partition 24 respectively.

The groove 46 is formed concentrically with the piston 12 and the rock-shaft 10, and in the present instance, constitutes the main by-pass for the oil or other fluid from one of the operating chambers to the other. The size of the groove 46 is preferably made sufficient to permit quite fine oscillation of the wing or piston 12 and of the rock-shaft 10. The groove 45 is made eccentric to the groove 46 and is preferably arranged with the greatest depth under a control valve or plunger 47 to be referred to, and so that the depth of the groove gradually diminishes toward each end of the groove.

When an excessive road shock is encountered and the piston is moved to an extreme position, the resistance offered to the flow of oil, as it is forced through the by-pass by the piston, is automatically increased.

Furthermore, because of the tapered construction of the groove 45 in both directions from its center, variations in the resistance offered to the flow of oil are automatically rendered proportionate to the extent of the road shock, thus producing a most desirable shock absorber and one which permits most efficient and free spring action during the travel of the motor vehicle over relatively smooth roads, while providing for increased restraint or resistance over poor roads.

Provision is also preferably made for adjusting the extent of the resistance offered to the flow of the oil through the by-pass during the movement of the piston back and forth, and as herein shown the valve or plunger member 47 is mounted within a hole drilled in the casing and in a portion of the partition 24, as illustrated in Figs. 4 and 5.

The plunger 47 may be manually or automatically operated and in the present instance is designed to be manually operated, and is provided upon its upper end with a threaded plug 48 which is screwed into a threaded portion of the hole to thereby permit the convenient adjustment of the position of the plunger 47 by screwing the plug into and out of its threaded hole.

The plunger 47 is arranged to extend transversely of and preferably to form a valve for the concentric groove 46, and the position of the threaded plug with respect to the end of the threaded hole is preferably such that when the threaded plug is screwed into the threaded hole until the plug engages the bottom of the hole, the plunger 47 will extend completely across the groove 46 for its entire depth.

From the description thus far, and an inspection of Figs. 4 and 5, it will be apparent that during the oscillations of the piston 12 back and forth under normal road conditions, the effective depth of the groove 36 will be adjustably determined by the position of the plunger 47. The adjusting plug for the plunger 47 is concealed by a closure plug 49 screwed into a threaded hole in the casing, and when it is desired to vary the resistance offered to the by-pass of the oil, it is only necessary to remove the plug 49, and by means of a screw-driver alter the position of the adjusting plug, thus effectively controlling the depth of the groove 46.

Provision is preferably made in the present apparatus for minimizing the leakage of the oil or other fluid from either of the operating chambers 28, 29 outwardly along the rock-shaft 10, and as herein shown, an annular groove 50 is provided, as shown in Fig. 3, in the cap member 18 in a position arranged to catch any oil which may pass from said operating chambers and flow along the rock-shaft, and a passage 52 formed in the cap member 18 is arranged so that any oil accumulating in the annular groove 50 may be conducted back into the supply chamber 22.

So also provision is made for returning to the supply chamber 22 any oil which may pass from the operating chambers 28, 29 between the forward side of the piston 12 and the inner wall of the cap member 18. To this end, an annular groove 70 is formed at the circumference of the casing between it and the cap member, which groove is formed by beveling off the inner end of the casing. The annular groove 70 is connected with the supply chamber 22 by a slot 71 in the inner end of the casing at the top thereof as shown in Fig. 3.

The rock-shaft 10 may and preferably will be provided with a novel and highly efficient packing for insuring against the leakage of any oil out between the shaft and its bearing in the front wall or cap member 18, and as herein shown the hub 17 of the cap member 18 is provided with an annular groove 58 with which communicates a hole 60 drilled in a boss 61 on the said hub. The hole 60 and the annular groove 58 are filled with a plastic packing 59, which may be a mixture of sawdust and graphite, or other suitable materials, and pressure is maintained upon the body of the packing by means of a plunger 64 positioned in the hole 60.

The plunger 64 is urged against the packing to force it through the hole 60 and into the annular groove 58 by a spring 66 interposed between the plunger 64 and screw cap 68 which serves not only to close the end of the hole 60, but also to adjustably determine the compression in the spring and consequently to enable a substantially uniform pressure to be exerted on the packing during the life of the shock absorber, thus maintaining a fluid-tight joint between the rock-shaft and its bearing and avoiding the usual oil leakage which has been experienced with shock absorbers of the oil type, after the same have become slightly worn in use.

From the above description, it will be observed that the flow of oil or other fluid in opposite directions from one of the chambers 28, 29 to the other, is controlled by an adjustable device carried by a stationary part of the absorber and which is accessible to the operator from outside of the shock absorber, and while it may be preferred to employ the construction herein shown for accomplishing this result, it is not desired to limit the invention to the particular construction shown.

Under relatively smooth or normal road conditions, the piston or wing 12 is designed to have a limited movement in opposite directions so that the tapered end portions of the eccentric groove 45 are not brought into use to materially diminish the flow of fluid from one chamber 28, 29 to the other, but when the road condition becomes rough or abnormal, the movement of the piston 12 is extended to bring into use the tapered ends of the eccentric groove 45 and thereby increase the resistance to the flow of the fluid from one chamber to the other. As a result a gentle and smooth action is provided for the motor vehicle while traveling over normal roads and a gradually increasing resistance at the ends of the movement of the body of the vehicle in opposite directions is provided while the motor vehicle is traveling over rough or abnormal roads.

It may be preferred to use the eccentric groove with the concentric groove as herein shown, but it is not desired to limit the invention in this respect.

Having thus described the invention, what is claimed is:

1. In a shock absorber, in combination, a casing, a rock-shaft extended into the casing, a piston secured to the rock-shaft, a partition member extending around the rock-shaft and piston, fluid-containing chambers on opposite sides of the piston, a by-pass between said chambers comprising a groove formed in said partition, a second groove formed in the piston and having tapering portions for automatically restricting the flow of liquid through the by-pass as the travel of the piston is extended under abnormal road conditions, and a device extended into the first-mentioned groove for restricting the flow of fluid therethrough.

2. In a shock absorber, in combination, a casing, a rock-shaft extended into the casing, a piston secured to the rock-shaft, a partition member extending around the rock-shaft and piston, fluid-containing chambers on opposite sides of the piston, a by-pass between said chambers comprising a groove formed in said partition, a second groove formed in the piston and having tapering portions for automatically restricting the flow of fluid through the by-pass, as the travel of the piston is extended under abnormal road conditions, and a plunger member adjustably mounted in the partition and accessible from without the casing adapted to extend into the groove in the casing for restricting the fluid movement through the by-pass.

3. In a shock absorber, in combination, a casing provided with fluid-containing chambers, a piston in said casing, means for reciprocating said piston, a by-pass connecting said chambers and through which fluid may be forced freely in opposite directions by movement of said piston in opposite directions under normal road conditions, said by-pass having tapering portions for automatically restricting the flow of fluid through said by-pass as the travel of said piston is extended under abnormal road conditions, and a device co-operating with said by-pass between the tapering portions of the latter to regulate the quantity of fluid flowing in opposite directions through said by-pass, said device being accessible from outside the casing.

In testimony whereof, I have signed my name to this specification.

FREDERICK O. KILGORE.